United States Patent [19]
Groner et al.

[11] 3,781,112
[45] Dec. 25, 1973

[54] METHOD AND APPARATUS FOR ANALYSIS OF LEUKOCYTES USING LIGHT SCATTERED BY EACH LEUKOCYTE AT ABSORBING AND NON-ABSORBING WAVELENGTH

[75] Inventors: Warren Groner, Whitestone; Wilberdan Victor George, Brooklyn, both of N.Y.

[73] Assignee: Technicon Instruments Corporation, Tarrytown, N.Y.

[22] Filed: Dec. 15, 1972

[21] Appl. No.: 315,703

[52] U.S. Cl. .................... 356/39, 250/218, 356/73, 356/104
[51] Int. Cl. .................... G01n 33/16, G01n 21/00
[58] Field of Search .................... 356/39, 73, 103, 356/104, 212; 250/218

[56] References Cited
UNITED STATES PATENTS
3,675,768   7/1972   Legorreta-Sanchez ............... 356/39

*Primary Examiner*—Ronald L. Wibert
*Assistant Examiner*—V. P. McGraw
*Attorney*—S. P. Tedesco et al.

[57] ABSTRACT

Electrical signals, originating from a pair of independent photodetectors and generated by different optical reactions to each one of a large number of leukocytes contained in a suspension and flowed sequentially at a rapid rate transversely through a beam of light, are coupled for interaction of a differential type to discriminate and indicate by display and/or counting a subclass of stained leukocytes in the suspension. The discrimination utilizes a significant increase in one of the optical reactions, which is a dark field reaction, and a reduction in the other optical reaction, which is also a dark field reaction, effecting superior discrimination, while counting the leukocytes of the subclass and unstained leukocytes of the main class. One of the optical reactions is a reaction of one of the detectors highly sensitive to light at wavelengths of stain and the other is a reaction of the other detector substantially insensitive to light at wavelengths of stain but sensitive to light at longer wavelengths. Both a method and apparatus for accomplishment of this technique of sample analysis are contemplated.

10 Claims, 3 Drawing Figures

METHOD AND APPARATUS FOR ANALYSIS OF LEUKOCYTES USING LIGHT SCATTERED BY EACH LEUKOCYTE AT ABSORBING AND NON-ABSORBING WAVELENGTH

BACKGROUND OF THE INVENTION

1. Field of the Invention

This invention relates to the detection of the population of a subclass of stained leukocytes within unstained leukocytes in suspension, such as in whole human blood, while detecting the population of the unstained leukocytes.

2. Background of the Invention

It is known that the detection of populations of particualr leukocytes, or white blood cells, and the concurrent relationship of these populations to one another in a human blood sample is important in medical research and for the diagnosis of certain human diseases. Some of the prior work in the detection of populations of small particles has been documented in "Measurement of Small Particles Using Light Scattering: A Survey of the Current State of the Art" by A. E. Martens, Ann. N.Y. Ada. Sci. 58: 690–702; in "Rapid Multiple Mass Constituent Analysis of Biological Cells" by L.A. Kamentsky et al, Ann. N.Y. Acad. Sci. 157: 310–323; and in "Absorption Cytophotometry: Comparative Methodology for Heterogeneous Objects and the Two-Wavelength Method" by M. L. Mendelsohn, which appears in "Introduction to Quantitative Cytochemistry" edited by George L. Wied, Academic Press 1966, pp. 201–214.

Prior work in medical research and for diagnostic purposes is documented in Kamentsky et al U.S. Pat. No. 3,662,176 issued May 9, 1972, wherein there is disclosed an electro-optical system for particle analysis. In accordance therewith, small particles are passed one at a time in a stream across an optical detection station. At least two photodetecting devices are arranged to detect the optical reactions of each particle to illumination from a beam of light. The different optical reactions detected by the different detecting devices produce electrical signals which may be used to detect differences in the various particles when they are illuminated. This patent suggests, for the determination of population counts of stained and unstained cells in suspension, the use of two different electro-optical reaction signal pulses simultaneously generated by each one of the stained and unstained cells passing sequentially transversely through a beam of light and wherein one of these optical reactions is a wide-angle optical scatter detection at an absorption wavelength to determine absorption, and the other reaction is also a light scattering reaction of cells under analysis which is unaffected by stain. These simultaneous reactions were proposed to determine by light energy loss the optical density of the stained and unstained cells.

Prior to such optical analysis, the cells of the particular class of interest have their optical characteristics altered by a conventional staining technique which leaves the remainder of the cells in unstained condition. Such selective staining techniques for the various types of leukocytes are disclosed in the co-pending U.S. Pat. application of Groner et al, Ser. No. 85,353, filed Oct. 30, 1970, assigned to the same assignee as the instant invention, wherein there is disclosed an electro-optical method and apparatus for determining a white cell differential count of human blood cells.

One drawback of prior automated systems for the electrooptical determination of white cell differential counts of human blood is the difficulty encountered in detecting lightly stained cells for counting purposes, that is, to discriminate such lightly stained cells from unstained cells.

SUMMARY OF THE INVENTION

We have found that for particles, such as leukocytes, having an optical extinction cross section capable of being raised by a stain and which particles have an optical path difference less than five times the light wavelength, there is an increase in light scattering at a non-absorbing wavelength attendant upon precipitation in the staining reaction. This increase was also observed to accompany an attendant decrease in light scattering at absorbing wavelengths upon an increase in stain. This was unexpected and not predicated by prior known observations of others than an increase in stain results in a decrease of light scattering at wavelengths of stain. Our observations led us to the application of leukocyte analysis or white cell differential counting by utilizing simultaneous light scattering by the stained and unstained cells at absorbing and non-absorbing wavelengths for better sensitivity and superior discrimination of lightly stained cells from unstained cells. Such discrimination is enhanced by an improved signal-to-noise ratio.

In accordance with the invention, electrical signals, originating from a pair of independent photodetectors and generated by different optical reactions to each one of a large number of leukocytes contained in a suspension and flowed sequentially at a rapid rate through a beam of light, coupled for interaction of a differential type to discriminate and indicate by display and/or counting a subclass of stained leukocytes in the suspension. The discrimination utilizes a significant increase in one of the optical reactions, which is a darkfield reaction, and a reduction in the other optical reaction, which is also a darkfield reaction, effecting superior discrimination while counting the leukocytes of the subclass and the unstained leukocytes of the main class. One of the optical reactions is a reaction to one of the detectors highly sensitive to light at wavelengths of absorption and the other is a reaction of the other detector substantially insensitive to light at wavelengths of absorption but sensitive to light at longer wavelenghts. The objects of the invention are to provide both an improved method and apparatus for such leukocyte analysis. Further objects of the invention will be apparent from the following detailed description of the invention.

DETAILED DESCRIPTION OF THE INVENTION

Figure 1:
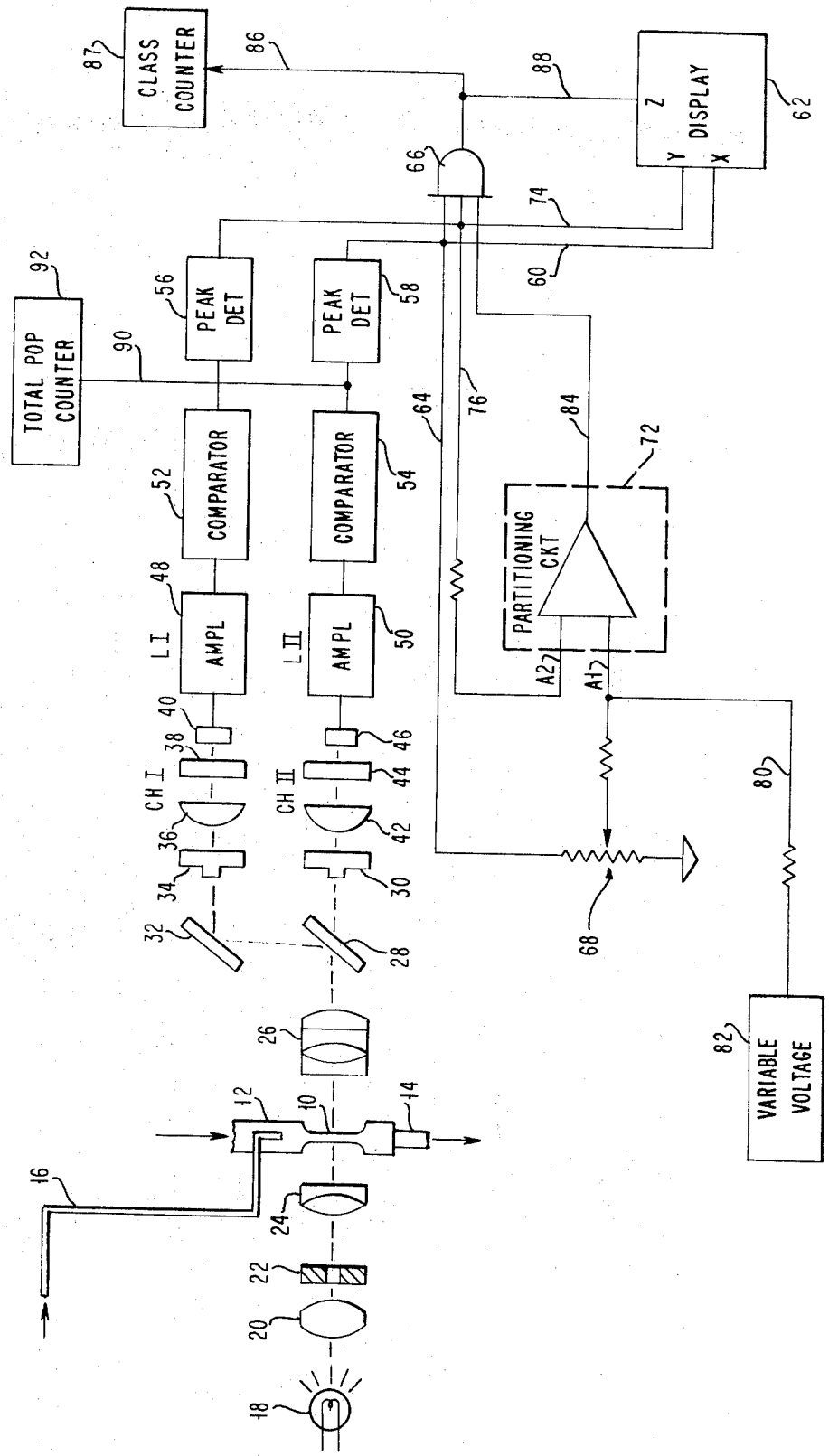
FIG. 1 is a schematic view of an analysis system embodying the invention.

In FIG. 1 of the drawings, there is illustrated by way of example a system for electro-optical analysis of leukocytes. The system includes an optical chamber formed by a flow cell 10 through which leukocytes are caused to flow one after another in a sheath stream. The liquid for the sheath is supplied through conduit 12. The flow cell has a discharge 14 to waste. The sheath stream may be water.

The leukocytes are supplied in suspension, as in a sample of human whole blood. The leukocytes of the class of interest are selectively stained prior to analysis so that the other leukocytes in the sample remain unstained. A staining technique is illustrated and described in the aforesaid co-pending U.S. Pat. application of Groner et al, Ser. No. 85,353 filed Oct. 30, 1970. The leukocytes of interest may be the class of basophils, for example, and toluidine blue, which is a conventional stain for such leukocytes, may be used. On the other hand, the selective staining of monocytes for detection of that class of leukocytes, for example, may be in accordance with the disclosure of Ansley et al, U.S. Pat. application Ser. No. 85,333 filed Oct. 30, 1970. The suspension flows from a source, not shown, through a conduit 16. The sheath stream may be supplied from any suitable source, not shown, for entrainment of the cellular particles. The combined stream is discharged through the outlet 14 downstream of the flow cell 10.

As the particles or cells pass through the optical chamber of the flow cell, they pass one after another through a narrow beam of light from a light source 18. The beam is conventionally dimensioned. To this end, light from the source is condensed by condenser lens 20 and passes through an aperture in stop 22 and through an illumination objective lens 24. This construction and arrangement provides a beam of light which is directed through the optical chamber to a detector objective lens 26 through which it passes. Light from the lens 26 is impinged upon a beam splitter or dichroic mirror 28. Light passing through the dichroic mirror 28 impinges on a dark field reticle 30. Light reflected by the dichroic mirror 28 is directed upon dichroic mirror 32 and light reflected by the dichroic element 32 is impinged upon dark field reticle 34.

Scattered light from an optical reaction in the viewing chamber, passing the dark field reticle 34 in the first optical channel, designated CHI, is directed upon diode detector lens 36, and passes through the last-mentioned lens to a wavelength-selective filter 38. Light passing through the filter 38 impinges upon a photodiode 40. In a similar fashion, scattered light from an optical reaction in the viewing chamber, passing the dark field reticle 30 in the second optical channel, designated CHII, is directed upon diode detector lens 42 through which it passes to a wavelength-selective filter 44. Light passing through filter 44 impinges on a photodiode 46. While each of the photodiodes 40 and 46 is responsive to light scattered by a cell in the viewing chamber and both register such scattering concurrently, filter-equipped diode 40 is more sensitive to light at absorbing wavelengths and filter-equipped photodiode 46 is more sensitive to light at non-absorbing or longer wavelengths. The pulse heights of the signals generated by the respective photodiodes accord with these sensitivities.

Signals generated by the transducers or photodiodes 40 and 46 are amplified in amplifiers 48 and 50 respectively. The outputs of amplifiers 48 and 50 are connected to the inputs of comparator circuits 52 and 54, respectively, operated as thresholding devices to effectively eliminate random noise. The comparators 52 and 54, located respectively in logic channels LI and LII associated respectively with optical channels CHI and CHII, provide inputs to sample and hold or peak detector devices 56 and 58, respectively. The respective output pulses of the devices 56, 58 correspond in amplitude to the peak amplitude of the signals generated by the photodiodes 40, 46, respectively, which signals are derived from the passage of stained and unstained cells through the flowcell 10.

The output of peak detector 58 along connection 60 is to the horizontal or X axis of the screen of display 62, and through connection 60 to connection 64. Connection 64 interconnects one input of AND gate 66 and a potentiometer 68 the wiper of which is connected to one input A1 of a partitioning circuit 72. The output of peak detector 56 along connection 74 is to the vertical or Y axis of the screen of the display 62, and through connection 74 to the connection 76. Connection 76 interconnects another input of AND gate 66 and, through a resistor, the remaining input A2 of the partitioning circuit 72.

The input A1 of the partitioning circuit 72 is in common with connection 80 from a source 82 of a variable voltage, which connection 80 has a resistor therein. The partitioning circuit 72 comprises a comparator and conventional associated circuitry configured to compare the imputs of A1 and A2. That is: if $A_o + MA1 - A2 > 0$, there is an output. If $A_o + MA1 - A2 < 0$, there is no output; wherein $A_o$ is the bias voltage produced by source 82, and wherein M is the ratio determined by the potentiometer 68.

The output of partitioning circuit 72 along connection 84 is to the remaining input of AND gate 66. The output of AND gate 66 is illustrated as being along connection 86 to the input of counting circuitry 87 including a conventional counter to count that portion or class of the cell population which may be stained cells of the population as hereinafter described. The aforesaid connection 86 has an input to connection 88 which in turn is connected to the Z terminal of the display 62. The output of AND gate 66 enables the display 62 through connection 88.

As illustrated in FIG. 1, the total population of stained and unstained cells may be counted as a function of the second logic channel. To this end, the output of comparator 54 along connection 90 has an input to conventional counting circuitry 92 including a counter.

Figure 2:
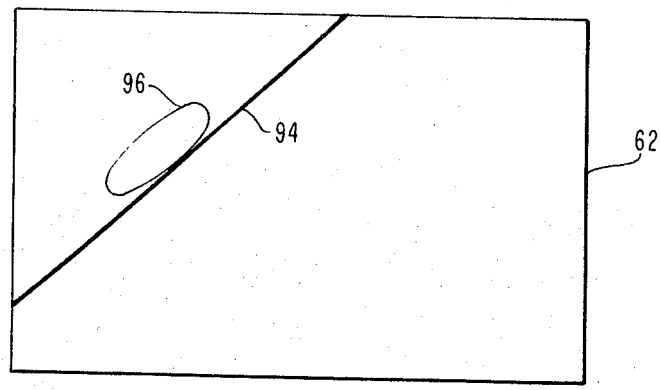
FIG. 2 is a diagrammatic view of a typical display produced by the system.

In FIG. 2 there is illustrated diagrammatically the function of the partitioning circuit 72 which, in effect, produces an angular threshold or mask. In a typical setting of the potentiometer 68 and the bias from variable voltage source 82 the threshold 94 extends upwardly and to right on the display 62, though it is invisible on the screen, and masks any cell display to the right of the threshold, while permitting any cells, such as stained cells for example, to appear as points of light to the left of the threshold, such as in the area bounded by line 96, for example. The line 96, of course, is invisible on the display. The display may be recorded as on film. In addition, a print-out may be associated with each of the counting circuits 87 and 92.

Figure 3:
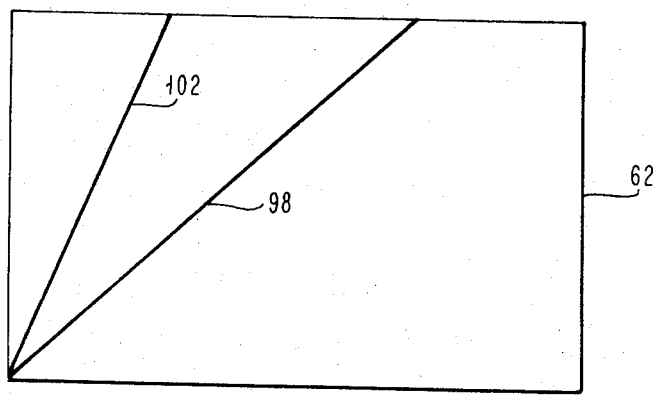
FIG. 3 is a diagrammatic representation illustrating adjustments of an angular threshold affecting the analysis.

In FIG. 3 there is illustrated an angular threshold 98 similar to the threshold 94 but in parallel and offset relation to the threshold 94 of FIG. 2, which is a function of an adjustment of the bias of the voltage from source 82. Of course, this achieves a different masking than threshold 94 for a different display, not shown. The threshold 98 is typical of a selected offset. On the other hand, the angle or slope of the threshold may be altered for selected masking as indicated by the threshold 102 of FIG. 3. This is achieved by adjustment of the potentiometer 68. It will be appreciated that the thresholds 98 and 102 are not co-existent.

While only one form of the invention has been illustrated and described it will be apparent, especially to those versed in the art, that the invention may take other forms and is susceptible of various changes without departing from the principles of the invention.

What is claimed is:

1. A method for distinguishing leukocytes having a particular optical absorption characteristic within a volume of liquid blood sample comprising;
   flowing said sample to pass said leukocytes one after another through an optical chamber;
   irradiating said optical chamber by a transverse beam of light;
   detecting the light scattered by each particle at absorbing and non-absorbing wavelengths; and
   comparing the light scattered at each of said wavelengths to identify leukocytes having said particular optical absorption characteristic.

2. A method as defined in claim 1, further including the step of counting the leukocytes having such absorption characteristic.

3. A method as defined in claim 1, further comprising the steps of counting the leukocytes having such absorption characteristic, and counting both the leukocytes having such characteristic and those not having such characteristic, for a comparison of the counts.

4. Apparatus for distinguishing leukocytes having a particular optical absorption characteristic within a volume of liquid blood sample, comprising:
   a flow cell forming an optical chamber having a transverse sight path;
   a light source from which a beam of light is directed along said sight path;
   means for flowing said leukocytes through said flow cell for irradiation by said beam one after another;
   means detecting the light scattered by each particle at absorbing and non-absorbing wavelengths; and
   means comparing the light scattered at each of said wavelengths to identify leukocytes having said particular optical absorption characteristics.

5. Apparatus as defined in claim 4 further including means for counting the leukocytes having such absorption characteristics.

6. Apparatus as defined in claim 4, further including means for counting the leukocytes having such absorption characteristic, and means for counting both the leukocytes having such characteristic and those not having such characteristic, for comparison of the counts.

7. Apparatus as defined in claim 4, wherein: said light-detecting means comprises two photodetectors responsive to light scattered by such irradiation of each leukocyte to simultaneously generate electrical signals, one photodetector being particularly responsive to light at absorbing wavelengths and the other photodetector being responsive to light at non-absorbing wavelengths, said comparison means receiving and coupling said signals to generate a differential output indicating the presence or absence of such absorption characteristic.

8. Apparatus as defined in claim 7, wherein: said comparison means comprises a variable voltage source connected to an output for one of said signals to bias said output and effect a threshold.

9. Apparatus as defined in claim 7, wherein: said comparison means receiving and coupling said signals comprises a partitioning circuit effecting an angular threshold.

10. Apparatus as defined in claim 7, wherein: said comparison means for receiving and coupling said signals comprises a partitioning circuit effecting an angular threshold and having an input for each of said signals, a variable voltage source being in common with one of said inputs, and a potentiometer being interposed in the other signal input.

* * * * *